United States Patent
Kutz et al.

(10) Patent No.: US 12,075,369 B2
(45) Date of Patent: Aug. 27, 2024

(54) POWER LEVEL SIGNALING FOR A WIRELESS COMMUNICATION SYSTEM

(71) Applicant: QUALCOMM Incorporated, San Diego, CA (US)

(72) Inventors: Gideon Shlomo Kutz, Ramat Hasharon (IL); Moshe Ben-Ari, Rehovot (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 17/651,207

(22) Filed: Feb. 15, 2022

(65) Prior Publication Data

US 2023/0262619 A1    Aug. 17, 2023

(51) Int. Cl.
*H04W 52/52* (2009.01)
*H04W 4/40* (2018.01)

(52) U.S. Cl.
CPC ............ *H04W 52/52* (2013.01); *H04W 4/40* (2018.02)

(58) Field of Classification Search
CPC ..... H04W 52/52; H04W 4/40; H04W 52/383; H04W 72/0473; H04W 52/346; H04W 72/21; H04W 52/146; H04W 52/16; H04W 4/46; H04W 28/0215; H04W 72/0446; H04W 72/02
See application file for complete search history.

(56) References Cited

U.S. PATENT DOCUMENTS

| | | | |
|---|---|---|---|
| 11,963,138 B2* | 4/2024 | Ko | H04W 72/02 |
| 2020/0145996 A1* | 5/2020 | Sun | H04W 72/21 |
| 2020/0266957 A1* | 8/2020 | Gulati | H04W 4/40 |
| 2021/0400699 A1* | 12/2021 | Nory | H04W 72/0446 |
| 2023/0054111 A1* | 2/2023 | Rudolf | H04W 72/0446 |

* cited by examiner

*Primary Examiner* — Lana N Le
(74) *Attorney, Agent, or Firm* — QUALCOMM Incorporated

(57) ABSTRACT

An apparatus for wireless communication includes a receiver and a transmitter that is configured to transmit a signal during a first slot. The signal has a power level that is associated with a transmission that is to occur during the first slot or during a second slot after the first slot. The signal is distinct from the transmission. The first slot and the second slot occur during a sub-frame time interval associated with a first cellular vehicle-to-everything (CV2X) wireless communication protocol, and the first slot and the second slot are associated with a second CV2X wireless communication protocol different than the first CV2X wireless communication protocol. The transmitter is further configured to perform the transmission during the second slot based on the power level.

22 Claims, 9 Drawing Sheets

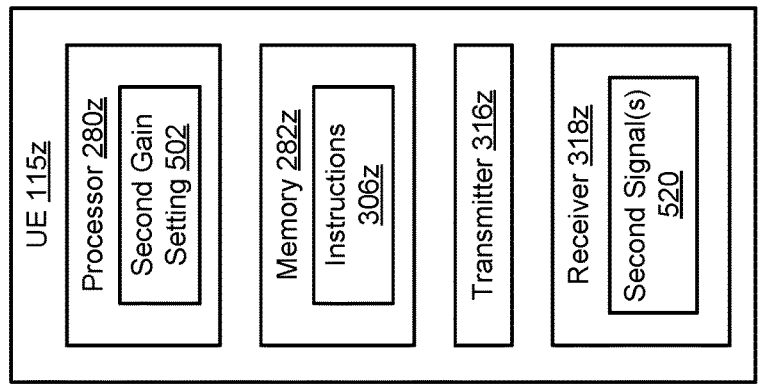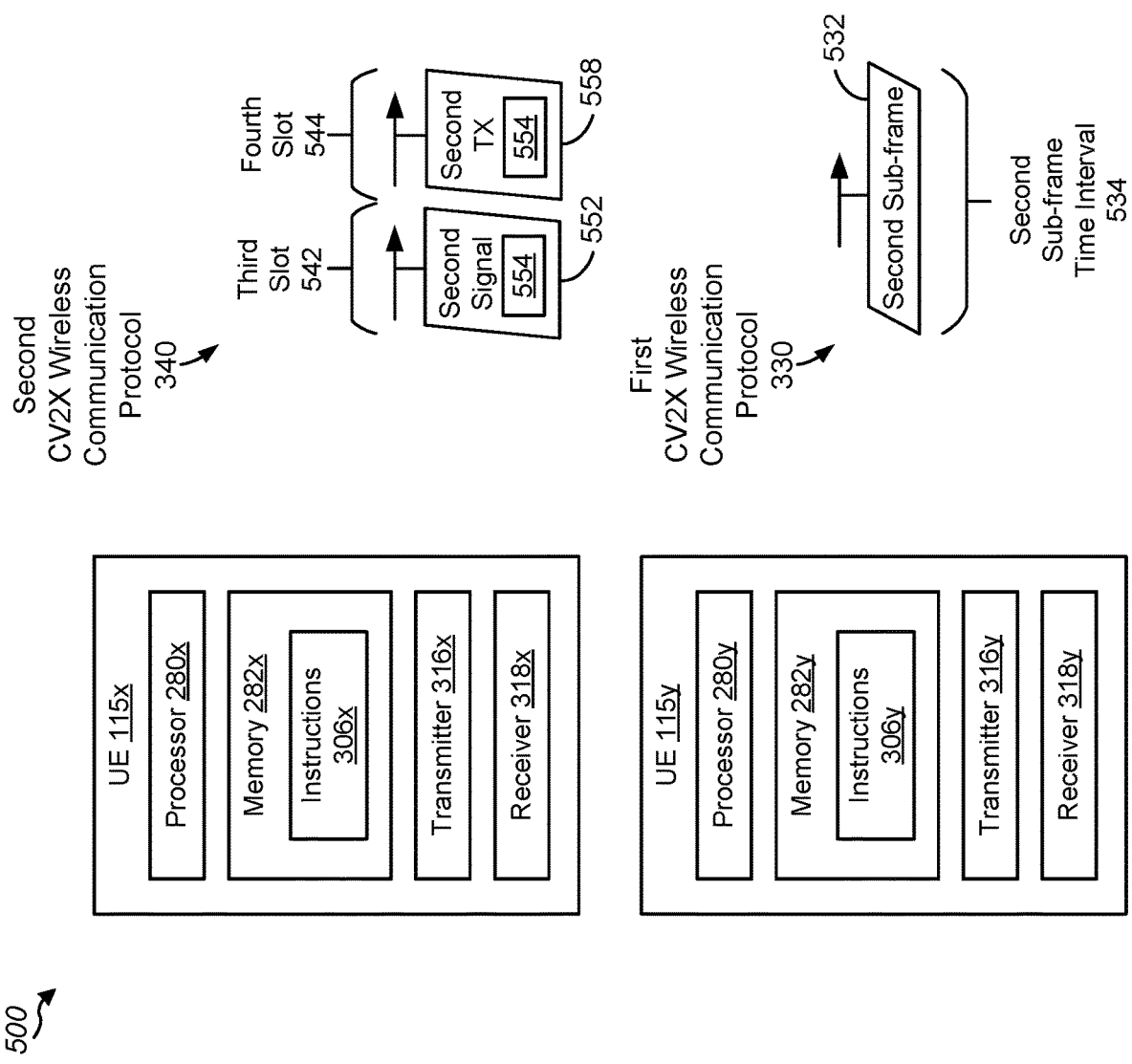
FIG. 5

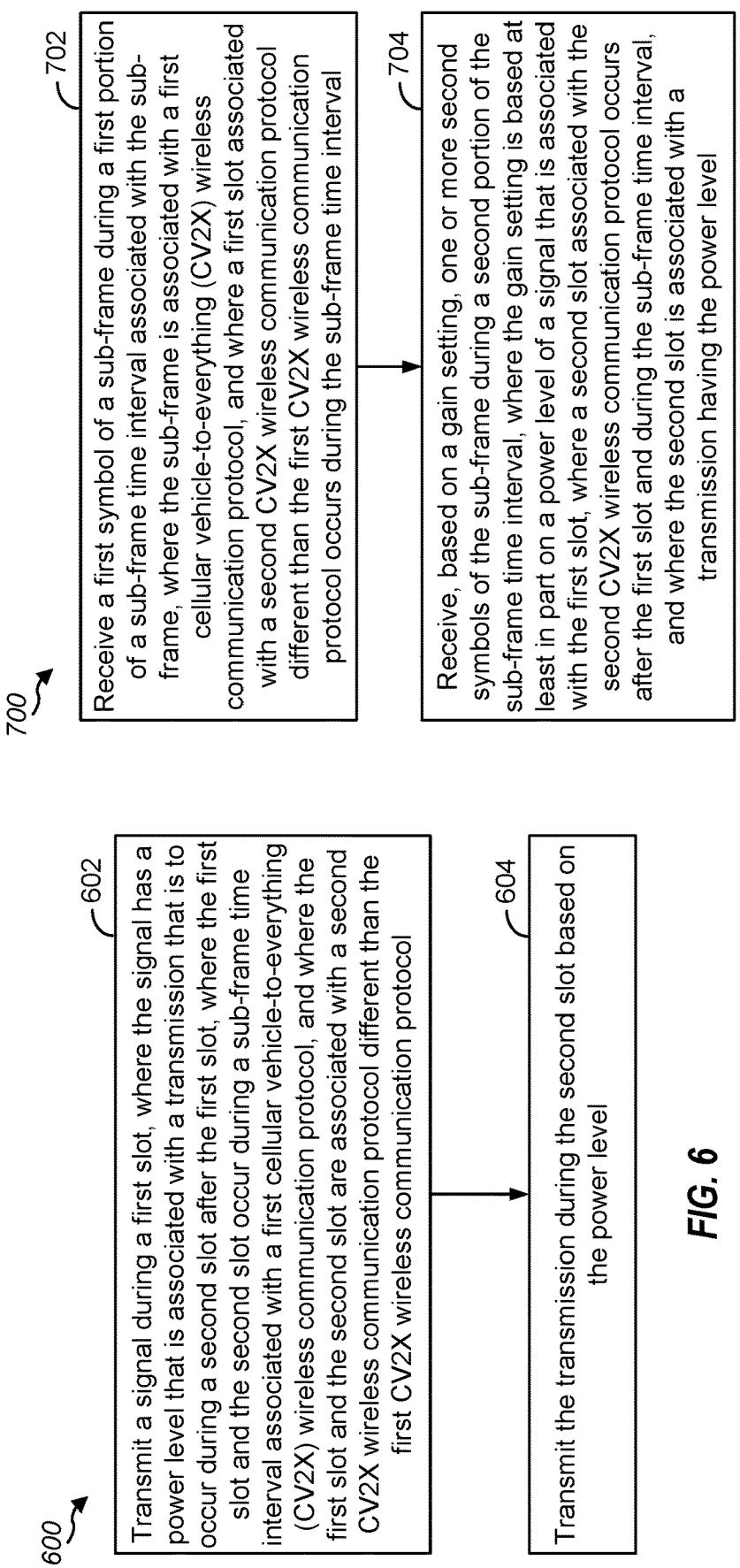

POWER LEVEL SIGNALING FOR A WIRELESS COMMUNICATION SYSTEM

TECHNICAL FIELD

Aspects of the present disclosure relate generally to wireless communication systems, and more particularly, to signal transmission and reception for wireless communication systems.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

In some aspects of the disclosure, an apparatus for wireless communication includes a receiver and a transmitter that is configured to transmit a signal during a first slot. The signal has a power level that is associated with a transmission that is to occur during the first slot or during a second slot after the first slot. The signal is distinct from the transmission. The first slot and the second slot occur during a sub-frame time interval associated with a first cellular vehicle-to-everything (CV2X) wireless communication protocol, and the first slot and the second slot are associated with a second CV2X wireless communication protocol different than the first CV2X wireless communication protocol. The transmitter is further configured to perform the transmission during the second slot based on the power level.

In some other aspects of the disclosure, an apparatus for wireless communication includes a transmitter and a receiver that is configured to receive a first symbol of a sub-frame during a first portion of a sub-frame time interval associated with the sub-frame. The sub-frame is associated with a first CV2X wireless communication protocol, and a first slot associated with a second CV2X wireless communication protocol different than the first CV2X wireless communication protocol occurs during the sub-frame time interval. The receiver is further configured to receive, based on a gain setting, one or more second symbols of the sub-frame during a second portion of the sub-frame time interval. The gain setting is based at least in part on a power level of a signal that is associated with the first slot. A second slot associated with the second CV2X wireless communication protocol occurs after the first slot and during the sub-frame time interval. The first slot or the second slot is associated with a transmission having the power level, where the transmission is distinct from the signal.

In some other aspects of the disclosure, a method for wireless communication includes transmitting a signal during a first slot. The signal has a power level that is associated with a transmission that is to occur during the first slot or during a second slot after the first slot. The signal is distinct from the transmission. The first slot and the second slot occur during a sub-frame time interval associated with a first CV2X wireless communication protocol, and the first slot is associated with a second CV2X wireless communication protocol different than the first CV2X wireless communication protocol. The method further includes performing the transmission during the second slot based on the power level.

In some other aspects of the disclosure, a method for wireless communication includes receiving a first symbol of a sub-frame during a first portion of a sub-frame time interval associated with the sub-frame. The sub-frame is associated with a first CV2X wireless communication protocol, and a first slot associated with a second CV2X wireless communication protocol different than the first CV2X wireless communication protocol occurs during the sub-frame time interval. The method further includes receiving, based on a gain setting, one or more second symbols of the sub-frame during a second portion of the sub-frame time interval. The gain setting is based at least in part on a power level of a signal that is associated with the first slot. A second slot associated with the second CV2X wireless communication protocol occurs after the first slot and during the sub-frame time interval. The first slot or the second slot is associated with a transmission having the power level, where the transmission is distinct from the signal.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is a block diagram illustrating an example of wireless communication system according to one or more aspects.

FIG. 6 is a flow diagram illustrating an example of a method of wireless communication according to one or more aspects.

FIG. 7 is a flow diagram illustrating another example of a method of wireless communication according to one or more aspects.

DETAILED DESCRIPTION

Figure 1:
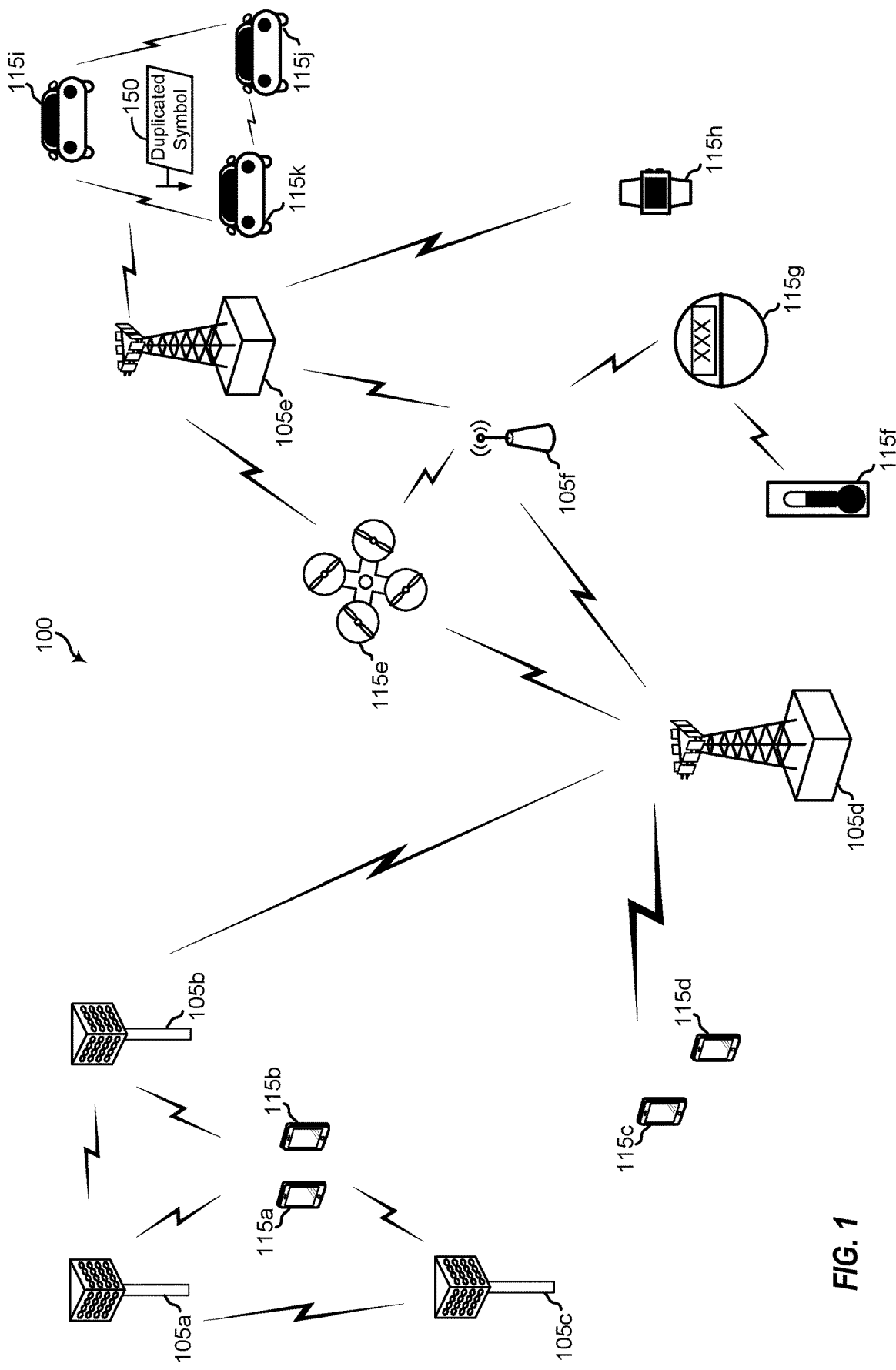
FIG. 1 is a block diagram illustrating an example of a wireless communication system according to one or more aspects.

As wireless communication systems are increasingly deployed to provide wireless connectivity, the potential for interference among different wireless communication systems may increase. For example, vehicle-based wireless communications may include long term evolution (LTE) cellular vehicle-to-everything (CV2X) wireless communications and new radio (NR) CV2X wireless communications.

In some cases, an NR CV2X wireless communications may affect reception of a LTE CV2X wireless communication. For example, to increase resource efficiency, an LTE CV2X frequency range and an NR CV2X frequency range may be included within a common frequency band (e.g., with little or no guard band separation) may not utilize time division multiplexing (TDM). As a result, in some circumstances, an NR CV2X wireless communication may affect reception of an LTE CV2X wireless communication, such as by introducing noise or interference, which may affect ability of an LTE CV2X receiving device to receive the LTE CV2X wireless communication.

To reduce effects of noise and interference, the LTE CV2X receiving device may perform an automatic gain control (AGC) procedure. To illustrate, to receive a subframe, the LTE CV2X receiving device is to perform an AGC procedure during an initial portion of time interval associated with the sub-frame. The initial portion may be referred to as an AGC setting time. During the AGC setting time, the LTE CV2X receiving device may detect or measure an amount of noise, interference, or signals and may determine a gain setting based on the amount of noise, interference, or signals. The LTE CV2X receiving device may use the gain setting to receive the sub-frame during a remainder of the sub-frame time interval (following the AGC setting time).

In some circumstances, an NR CV2X wireless communication may begin after the AGC setting time. For example, two slots of the NR CV2X wireless communication protocol may occur during the sub-frame time interval, and the NR CV2X wireless communication may begin during the latter slot of the two slots. In such examples, the gain setting determined by the LTE CV2X receiving device during the AGC setting time may not reflect noise or interference associated with the NR CV2X wireless communication, which may reduce ability of the LTE CV2X receiving device to receive the sub-frame. For example, if the gain setting is relatively high (e.g., due to a low amount of signals, noise, or interference during the AGC setting time), and if a power level of the NR CV2X wireless communication during the latter half of the sub-frame time interval is relatively large, receiver saturation may occur at the LTE CV2X receiving device, potentially causing data loss.

Further, some conventional devices may attempt to reduce or mitigate receiver saturation during reception of an LTE CV2X wireless communication by increasing frequency selectivity of certain receiver components (such as analog components). Increasing the frequency selectivity of such components may increase cost and circuit complexity of a receiver.

In some aspects of the disclosure, prior to transmitting an NR CV2X communication that is to have a particular power level, a transmitting device may transmit a signal having the particular power level. In an illustrative example, the transmitting device may duplicate a symbol of the NR CV2X communication and may transmit the duplicated symbol as the signal during a first slot that precedes a second slot during which the NR CV2X communication is to occur. As a result, an LTE CV2X receiving device performing an AGC procedure during an initial portion (e.g., during a first symbol position) of the first slot may set a gain for receiving a sub-frame during the first slot and the second slot that is based at least in part on the power level of the NR CV2X communication (e.g., instead of setting the gain independently of the power level of the NR CV2X communication).

In some implementations, the signal and the transmission may be transmitted using a sidelink data channel or using a sidelink control channel. In such examples, the transmission may include data or control information, respectively. In some other examples, the transmission may include feedback, and the signal and the transmission may be transmitted using a feedback channel. In some such examples, the transmission may occur during the first slot or during the second slot, as explained further below.

By setting the gain based at least in part on a power level of an NR CV2X communication that is to occur during a latter part of a sub-frame time interval, an LTE CV2X receiving device may avoid setting a gain too high (e.g., based on a low power level detected during an initial part of the sub-frame time interval, which may result in receiver saturation associated with potential data loss). As a result, instances of data loss due to receiver saturation may be reduced or avoided.

Further in some implementations, one or more features described herein may reduce cost or circuit complexity, or power consumption of a device. For example, in some aspects, receiver saturation may be reduced or avoided without attempting to "isolate" NR CV2X wireless communications (e.g., by increasing frequency selectivity of analog receiver components to avoid reception of, or to "reject," NR CV2X wireless communications, as in certain conventional devices). Increasing frequency selectivity of analog receiver components may involve circuitry that consumes power and that is associated with increased cost and circuit area. As a result, in some examples, cost, circuit complexity, and power consumption of a receiver may be reduced as compared to certain conventional devices.

To further illustrate, some aspects described herein may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS, LTE, and NR are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements, etc. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, aggregated or dis-aggregated deployments, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

One or more devices described herein may include one or more components that are located at a single physical location or one or more components located at various physical locations. For example, the base station 105 may include components that are located at various physical locations, the various components may each perform various functions such that, collectively, the various components achieve functionality that is similar to a base station 105 that is located at a single physical location. As such, a base station 105 described herein may equivalently refer to a standalone base station 105 (also known as a monolithic base station) or a base station 105 including components that are located at various physical locations or virtualized locations (also known as a disaggregated base station). In some implementations, such a base station 105 including components that are located at various physical locations may be referred to as or may be associated with a disaggregated radio access network (RAN) architecture, such as an Open RAN (O-RAN) or Virtualized RAN (VRAN) architecture. In some implementations, such components of a base station 105 may include or refer to one or more of a central unit (or centralized unit CU), a distributed unit (DU), or a radio unit (RU).

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting infrastructure, water infrastructure, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

In some implementations, a UE 115 (e.g., the UE 115i) may duplicate a symbol of a transmission (e.g., to generate a duplicated symbol 150) prior to performing the transmission. The UE 115 may transmit the duplicated symbol prior to performing the transmission, such as in a first slot preceding a second slot during which the UE 115 is to perform the transmission. The duplicated symbol 150 may have a common power level as the transmission. As a result, one or more UEs 115 (such as one or more of the UE 115k, the UE 115j, or another UE 115) receiving the duplicated symbol 150 may perform automatic gain control (AGC) based on the power level, as described further below.

Figure 2:
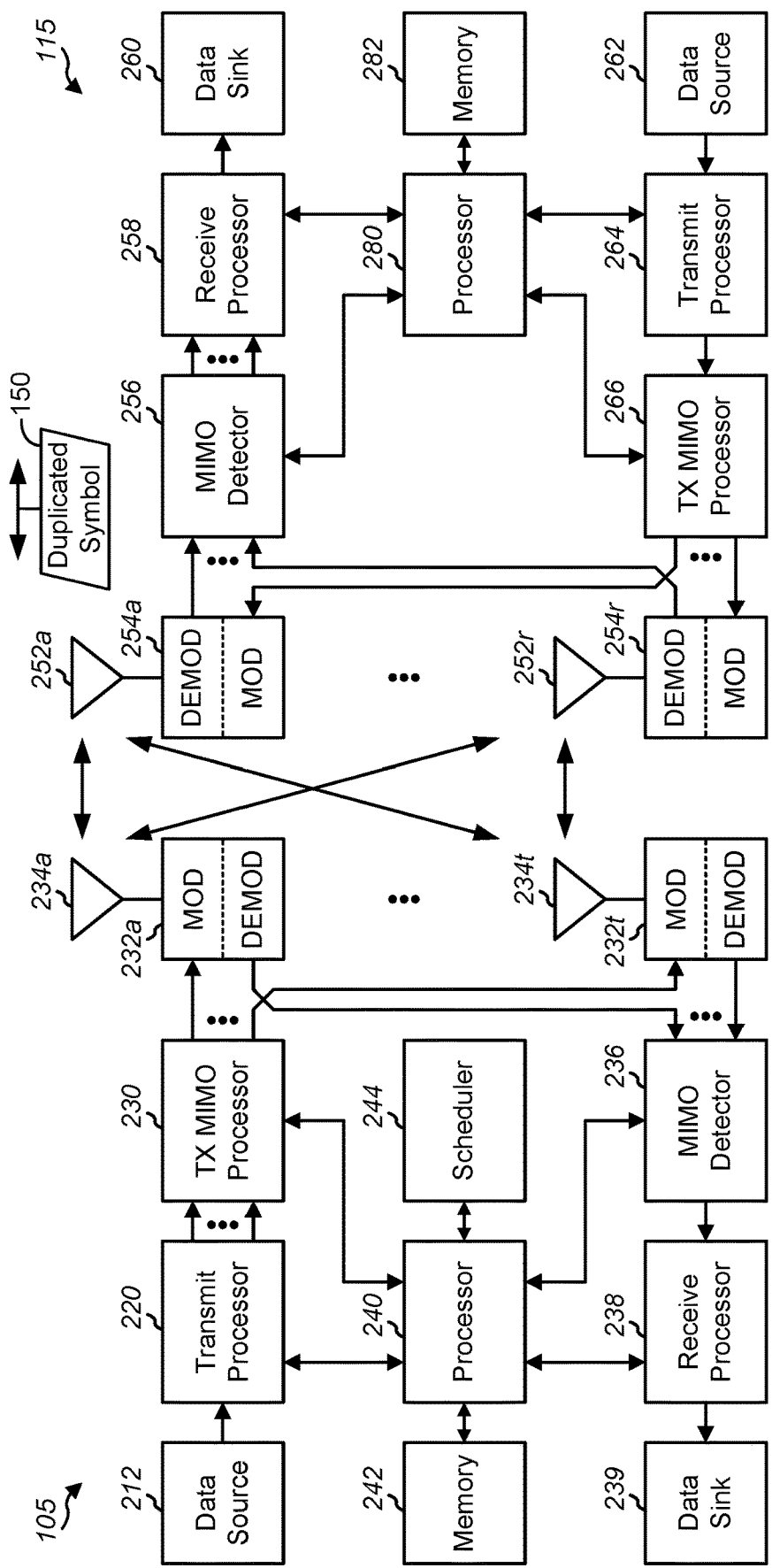
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from processor 240. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to processor 280.

On the uplink, at UE 115, transmit processor 264 may receive and process data (e.g., for a physical uplink shared channel (PUSCH)) from data source 262 and control information (e.g., for a physical uplink control channel (PUCCH)) from processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to processor 240.

Processors 240 and 280 may direct the operation at base station 105 and UE 115, respectively. Processor 240 or other processors and modules at base station 105 or processor 280 or other processors and modules at UE 115 may perform or direct the execution of various processes for the techniques described herein, such as initiate, perform, or control transmission or reception of the duplicated symbol 150. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
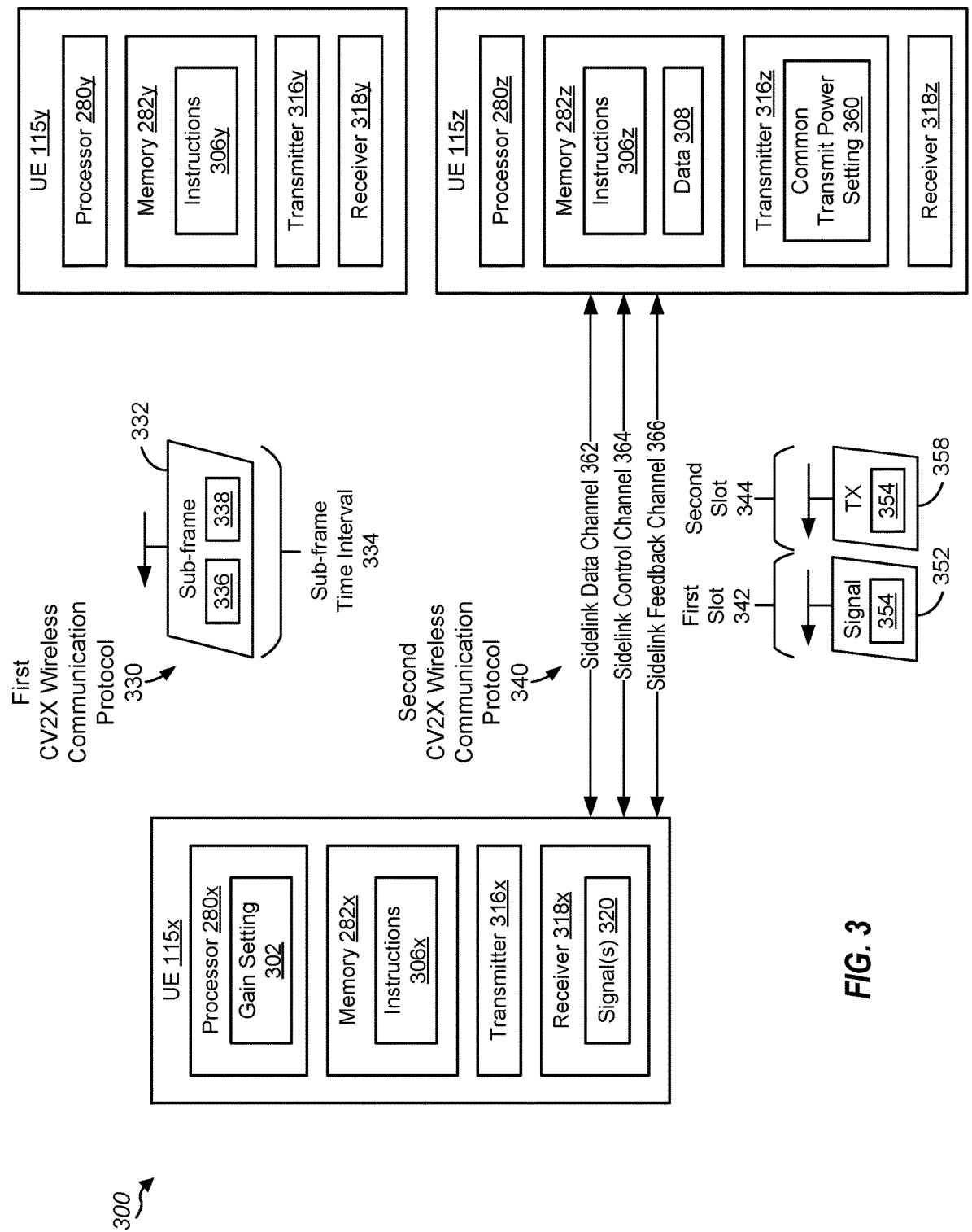
FIG. 3 is a block diagram illustrating an example of wireless communication system according to one or more aspects.

FIG. 3 is a block diagram illustrating an example of a wireless communication system 300 according to some aspects of the disclosure. The wireless communication system 300 may include one or more UEs, such as a UE 115x, a UE 115y, and a UE 115z. In some examples, the UE 115x may correspond to one of the UEs 115a-k of FIG. 1, the UE 115y may correspond to another of the UEs 115a-k, and the UE 115z may correspond to another of the UEs 115a-k. To further illustrate, in one example, the UEs 115x-z correspond to the UEs 115*i-k* of FIG. 1. The wireless communication system 300 may also include one or more base stations, such as the base station 105.

FIG. 3 illustrates that the UEs 115*x-z* may each include one or more processors, such as the processor 280, and may each include one or more memories, such as the memory 282. For example, the UE 115*x* may include a processor 280*x* and a memory 282*x*, the UE 115*y* may include a processor 280*y* and a memory 282*y*, and the UE 115*z* may include a processor 280*z* and a memory 282*z*. The UE 115*x* may include a transmitter 316*x* and a receiver 318*x*, the UE 115*y* may include a transmitter 316*y* and a receiver 318*y*, and the UE 115*z* may include a transmitter 316*z* and a receiver 318*z*. The processor 280*x* may be coupled to the memory 282*x*, to the transmitter 316*x*, and to the receiver 318*x*. The processor 280*y* may be coupled to the memory 282*y*, to the transmitter 316*y*, and to the receiver 318*y*. In some examples, the transmitters 316*x-z* and the receivers 318*x-z* may include one or more components described with reference to FIG. 2, such as one or more of the modulator/demodulators 254*a-r*, the MIMO detector 256, the receive processor 258, the transmit processor 264, or the TX MIMO processor 266.

The transmitters 316*x-z* may be configured to transmit reference signals, synchronization signals, control information, and data to one or more other devices, and the receivers 318*x-z* may be configured to receive reference signals, control information, and data from one or more other devices. For example, in some implementations, the transmitters 316*x-z* may be configured to transmit signaling, control information, and data to one or more devices, and the receivers 318*x-z* may be configured to receive signaling, control information, and data from one or more devices.

In some implementations, the memories 282*x-z* store instructions executable by the processors 280*x-z* to initiate, perform, or control one or more operations described herein. For example, the memory 282*x* may store instructions 306*x* executable by the processor 280*x* to initiate, perform, or control one or more operations described herein. As another example, the memory 282*y* may store instructions 306*y* executable by the processor 280*y* to initiate, perform, or control one or more operations described herein. As an additional example, the memory 282*z* may store instructions 306*z* executable by the processor 280*z* to initiate, perform, or control one or more operations described herein.

In some implementations, one or more of the transmitters 316*x-z* or the receivers 318*x-z* may include an antenna array. The antenna array may include multiple antenna elements that perform wireless communications with other devices. In some implementations, the antenna array may perform wireless communications using different beams, also referred to as antenna beams. The beams may include transmit beams and receive beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. In some implementations, one or more sets of antenna elements of the antenna array may be configured to concurrently generate multiple beams, for example using multiple RF chains. A set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

In some examples, one or more of the UEs 115*x-z* may correspond to a vehicle that wirelessly communicates (e.g., using an onboard unit (OBU)) with other vehicles, base stations, road infrastructure equipment, roadside units (RSUs), or other devices using one or more wireless communication protocols. For example, one or more of the UEs 115*x-z* may correspond to a vehicle that wirelessly communicates using one or more of a cellular vehicle-to-everything (CV2X) wireless communication protocol. Alternatively or in addition, one or more of the UEs 115*x-z* may correspond to a device other than a vehicle, such as an RSU or another device. A CV2X wireless communication protocol may enable vehicle-based wireless communications, such as vehicle-to-vehicle (V2V) wireless communications, vehicle-to-infrastructure (V2I) wireless communications, vehicle-to-pedestrian (V2P) wireless communications, vehicle-to-cloud (V2C) wireless communications, other vehicle-based wireless communications, or a combination thereof.

To further illustrate, in some examples, the UE 115*x* and the UE 115*y* operate based on at least a first CV2X wireless communication protocol 330, and the UE 115*z* operates based on at least a second CV2X wireless communication protocol 340 that is different than the first CV2X wireless communication protocol 330. In some implementations, the first CV2X wireless communication protocol 330 may enable communication of a first type of communication (such as one or more of safety messages, alerts, emergency communications, vehicle sensor data, or traffic information) among vehicles and RSUs of the wireless communication system 300, and the second CV2X wireless communication protocol 340 may enable a second type of communication different than the first type (e.g., other data communication, such as text messages and emails) among vehicles of the wireless communication system 300. Alternatively or in addition, the first CV2X wireless communication protocol 330 may be associated with a first data throughput, and the second CV2X wireless communication protocol 340 may be associated with a second data throughput greater than the first data throughput. To further illustrate, the second data throughput may enable one or more of sharing of video sensor data among vehicles (or other devices) or advanced safety services, such as convoyed (or "platooned") driving features, which may be unsupported by the first CV2X wireless communication protocol 330 in some implementations. In some examples, the first CV2X wireless communication protocol 330 may correspond to an LTE CV2X wireless communication protocol, and the second CV2X wireless communication protocol 340 may correspond to an NR CV2X wireless communication protocol.

In some implementations, the first CV2X wireless communication protocol 330 may be associated with a first frequency range, and the second CV2X wireless communication protocol 340 may be associated with a second frequency range. In some examples, the first frequency range and the second frequency range may be included in a common frequency band of a vehicle-based communication network, such as a frequency band of an intelligent transport system (ITS). To further illustrate, in some examples, the first frequency range may correspond to a first sub-band of an ITS 5.9 gigahertz (GHz) frequency band, and the second frequency range may correspond to a second sub-band of the ITS 5.9 GHz frequency band. In some examples, the first frequency range is adjacent to (e.g., shares a common frequency boundary as) the second frequency range. In some other examples, the first frequency range may be separated from the second frequency range by a guard band frequency range.

The first CV2X wireless communication protocol 330 may specify sub-frame time intervals for transmission of messages, alerts, vehicle information, emergency information, traffic information, sensor data, and other information. The sub-frame time intervals may include a sub-frame time interval 334. The second CV2X wireless communication protocol 340 may specify slots for transmission of messages, alerts, vehicle information, emergency information, traffic information, sensor data, and other information. The slots may include a first slot 342 and a second slot 344. In some examples, a slot may have a duration that is half a duration of a sub-frame. For example, the first slot 342 may occur during one half of the sub-frame time interval 334, and the second slot 344 may occur during the other half of the sub-frame time interval 334. To further illustrate, in a non-limiting example, the sub-frame time interval 334 may correspond to one millisecond (ms), the first slot 342 may correspond to the initial 0.5 ms of the sub-frame time interval 334, and the second slot 344 may correspond to the subsequent 0.5 ms of the sub-frame time interval 334.

In some implementations, sub-frame time intervals associated with the first CV2X wireless communication protocol 330 may be aligned or synchronized with slots associated with the second CV2X wireless communication protocol 340. In some examples, the sub-frame time interval 334 and the first slot begin at a common time that is based on signaling of a global navigation satellite system (GNSS).

In some implementations, the first CV2X wireless communication protocol 330 and the second CV2X wireless communication protocol 340 may each be associated with one or more wireless communication channels, such as one or more sidelink wireless communication channels. For example, the second CV2X wireless communication protocol 340 may associated with one or more of a sidelink data channel 362, a sidelink control channel 364, or a sidelink feedback channel 366. To further illustrate, in some examples, the sidelink data channel 362 may correspond to a physical sidelink shared channel (PSSCH), the sidelink control channel 364 may correspond to a physical sidelink control channel (PSCCH), and the sidelink feedback channel 366 may correspond to a physical sidelink feedback channel (PSFCH).

During operation, devices of the wireless communication system 300 may wirelessly communicate messages, alerts, vehicle information, emergency information, traffic information, sensor data, other information, or a combination thereof. For example, the UE 115y may transmit a sub-frame 332 during a sub-frame time interval 334 and in accordance with the first CV2X wireless communication protocol 330. In some examples, the sub-frame 332 may include one or more of an alert, vehicle information, emergency information, traffic information, sensor data, other information, or a combination thereof. In some implementations, the UE 115y may transmit the sub-frame 332 via a broadcast transmission (e.g., to the UE 115x). To illustrate, in some examples, the first CV2X wireless communication protocol 330 may correspond to an LTE CV2X wireless communication protocol, and the UE 115y may transmit the sub-frame 332 via a broadcast transmission (e.g., to the UE 115x). As another example, the UE 115z may perform a transmission 358 during the second slot 344. In some examples, the transmission 358 may include one or more of an alert, vehicle information, emergency information, traffic information, sensor data, other information, or a combination thereof. In some examples, the UE 115z may perform the transmission 358 via a broadcast transmission.

In some examples, the sub-frame 332 includes a first symbol 336 transmitted during a first portion of the sub-frame time interval. The first portion may include or may correspond to an initial symbol position associated with the sub-frame time interval 334 and may correspond to an automatic gain control (AGC) setting time. To receive the sub-frame 332, the UE 115x may perform an AGC process during the first portion of the sub-frame time interval 334. For example, in some implementations, the sub-frame time interval 334 may include fourteen symbol positions (which may have indices 0, 1, 2, . . . 13). Symbol position 0 of the sub-frame time interval may correspond to an AGC setting time during which the UE 115x is to detect one or more signals 320 (e.g., the first symbol 336 and optionally one or more other signals, noise, or interference), to determine a power level associated with the one or more signals 320, and to determine, based on the power level, a gain setting 302 for receiving the sub-frame 332.

In some examples, detecting the one or more signals 320 may include measuring signal energy associated with a first frequency range that is associated with the first CV2X wireless communication protocol 330 that is also associated with a second frequency range that is associated with the second CV2X wireless communication protocol 340. For example, the UE 115x may set the receiver 318x to receive based on both the first frequency range and the second frequency range. The one or more signals 320 may include one or more signals associated with the first CV2X wireless communication protocol 330 (such as the first symbol 336 of the sub-frame 332), one or more signals associated with the second CV2X wireless communication protocol 340, or a combination thereof.

The UE 115x may receive, based on the gain setting 302, one or more second symbols 338 of the sub-frame 332 during a second portion of the sub-frame time interval 334. For example, the one or more second symbols 338 may include or correspond to symbols transmitted during symbol positions 1-13 of the sub-frame time interval 334. In some implementations, the UE 115x may apply the gain setting 302 to one or more low-noise amplifiers (LNAs) of the receiver 318x to receive the one or more second symbols 338.

In some cases, the UE 115z may begin the transmission 358 after the AGC process associated with the sub-frame 332, which may cause receiver saturation in some cases. To illustrate, the AGC process may occur during symbol position 0 of the sub-frame time interval 334, and the second slot 344 may occur during symbol positions 7-13 of the sub-frame time interval 334. If signals received during symbol position 0 are associated with a power level that is much less than a power level 354 of the transmission 358, then the gain setting 302 may be relatively large. For example, the UE 115z may be relatively physically near to the UE 115x or may perform the transmission 358 using a relatively large power level 354 (e.g., to communicate with a device that is physically far from the UE 115z). In such examples, reception of the transmission 358 using the gain setting 302 may result in receiver saturation of the receiver 318x (due to both the gain setting 302 and the power level 354 being relatively large), which may be associated with loss of data of the sub-frame 332 in some cases.

In some aspects of the disclosure, the UE 115z may transmit (e.g., via one of the sidelink data channel 362, the sidelink control channel 364, or the sidelink feedback channel 366) a signal 352 during the first slot 342 to indicate the power level 354 of the transmission 358 that is to be performed during the second slot 344. In some examples, the signal 352 may include or correspond to a subset of the transmission 358 that indicates the power level 354 of the transmission 358 prior to the transmission 358. In some examples, the subset may correspond to the duplicated symbol 150. The power level 354 of the signal 352 may contribute to a receive power of the one or more signals 320. For example, the receive power of the one or more signals 320 may correspond to or may be based on a sum of the power level 354 of the signal 352 and a power level of the first symbol 336.

In some other examples, the power level 354 may correspond to a transmit power of the signal 352 and the transmission 358. For example, the UE 115z may set the signal 352 to the same power level 354 as the transmission 358, such as by using a common transmit power setting 360 of the transmitter 316z to transmit the signal 352 and the transmission 358 (e.g., where the common transmit power setting 360 is specified by a particular transmission configuration indicator (TCI) state associated with the transmitter 316z). The UE 115z may transmit the signal 352 during symbol 0 of the sub-frame 332. The one or more signals 320 received by the UE 115x may include the signal 352. As a result, the gain setting 302 may reflect the power level 354 of the transmission 358, and instances of receiver saturation due to the transmission 358 may be reduced or avoided.

In some examples, the signal 352 and the transmission 358 may correspond to separate (e.g., discrete) transmissions by the UE 115z. For example, the transmitter 316z may transmit the signal 352 and the UE 115x may receive the signal 352 during a first portion of the first slot 342. In some examples, the transmitter 316z may terminate transmitting (and the UE 115x may not receive) the signal 352 during a second portion of the first slot occurring after the first portion. In some examples, the first portion corresponds to a first symbol position of the first slot 342, and the second portion corresponds to one or more symbol positions of the first slot 342 that occur after the first symbol position.

To further illustrate, in some examples, the UE 115z may modify a state of the UE 115z after transmitting the signal 352. For example, in some implementations, the UE 115z may adjust the transmitter 316z from a first state (e.g., an active state) used to transmit the signal 352 to a second state (e.g., a standby state or a low-power state) after transmitting the signal 352. After transmitting the signal 352 and prior to performing the transmission 358, the UE 115z may adjust the transmitter 316z from the second state to the first state to perform the transmission 358.

In some examples, the signal 352 and the transmission 358 may include first data 308 that is duplicated within a common symbol position of the first slot 342 and the second slot 344. For example, the signal 352 may include the first data 308 transmitted during a first symbol position within the first slot 342 and having the power level 354, and the transmission 358 may include the first data 308 transmitted during the first symbol position within the second slot 344 and having the power level 354. Duplicating the first data 308 within the first symbol position of the first slot 342 and the second slot 344 may reduce device complexity of the UE 115z in some implementations. In other implementations, the signal 352 may include different data or values than the transmission 358. As an illustrative example, in some implementations, the signal 352 may correspond to a reference signal transmitted by the UE 115z and having the power level 354. In some aspects, the UE 115x may receive the signal 352 from one of a first vehicle or a first RSU corresponding to the UE 115z and may receive the sub-frame 332 from one of a second vehicle or a second RSU corresponding to the UE 115y.

Figure 4A:
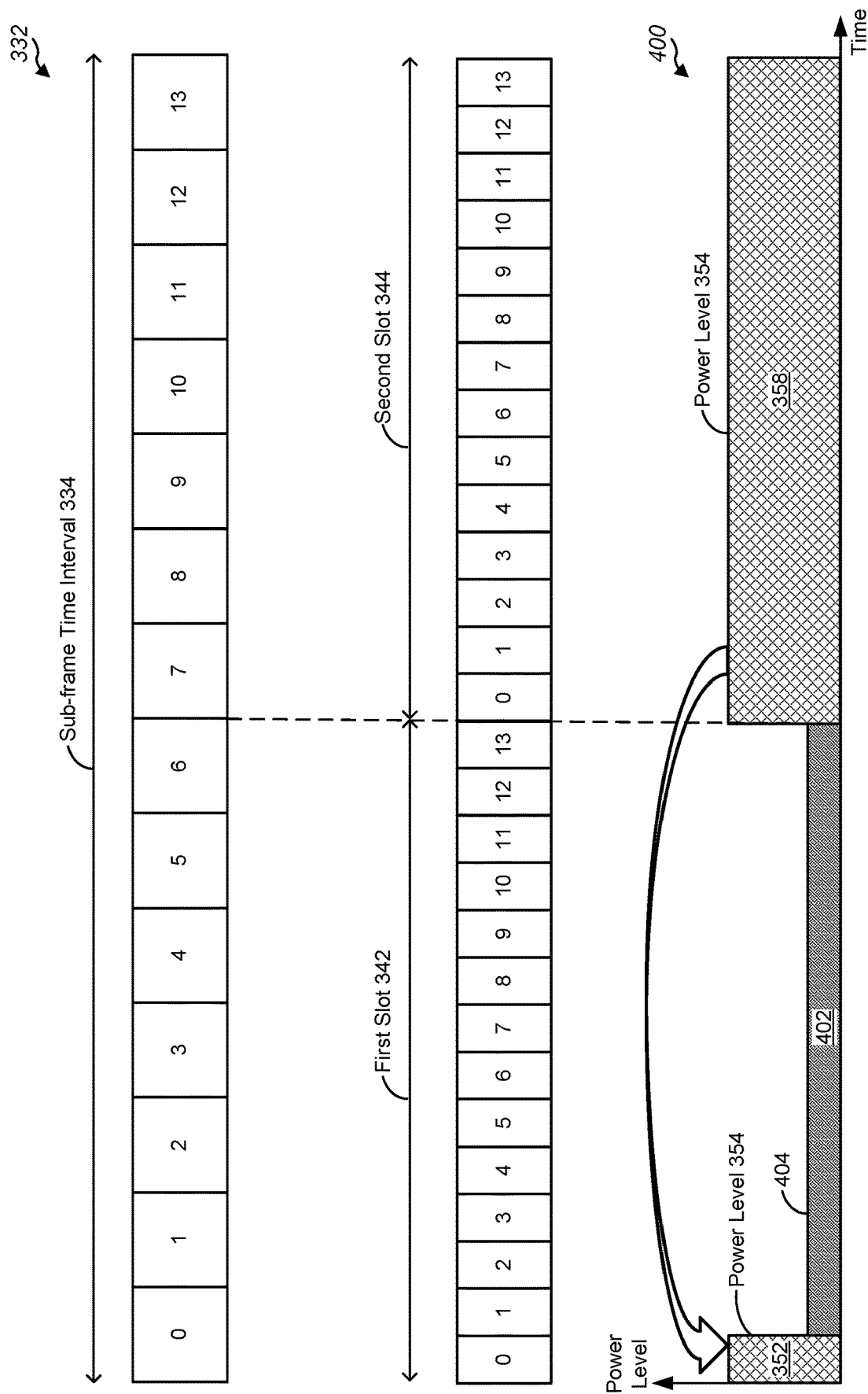
FIG. 4A is a diagram illustrating some aspects that may be associated with a wireless communication system, such as the wireless communication of FIG. 3, according to some aspects.

To further illustrate, FIG. 4A is a diagram illustrating some aspects that may be associated with a wireless communication system, such as the wireless communication system 300 of FIG. 3, according to some aspects. In some examples, the operations described with reference to FIG. 4A are performed using the sidelink data channel 362 or the sidelink control channel 364 of FIG. 3.

FIG. 4A depicts examples of the sub-frame time interval 334, the first slot 342, and the second slot 344. The sub-frame time interval 334 may include or may be associated with symbol positions 0, 1, 2, . . . 13, and each slot 342, 344 may be associated with symbol positions 0, 1, 2, . . . 13. In some examples, symbol position 0 may be referred to as a first symbol position, symbol position 1 may be referred to as a second symbol position, and symbol position 2 may be referred to as a third symbol position.

The example of FIG. 4A illustrates that a first transmission unit size of the sub-frame 332 may be greater than a second transmission unit size of the transmission 358, and the second transmission unit size of the transmission 358 may be greater than a third transmission unit size of the signal 352. For example, the first transmission unit size may correspond to fourteen symbols of the first CV2X wireless communication protocol 330, the second transmission unit size may correspond to fourteen symbols of the second CV2X wireless communication protocol 340, and the third transmission unit size may correspond to one symbol of the second CV2X wireless communication protocol 340. A first symbol duration associated with the sub-frame 332 (e.g., $\frac{1}{14}$ of one ms) may be greater than a second symbol duration associated with transmission 358 (e.g., $\frac{1}{14}$ of one-half ms).

FIG. 4A also illustrates a graph 400 having an abscissa representing time and an ordinate representing a power level. The graph 400 illustrates that a first portion of the first slot 342 (e.g., symbol position 0) is associated with the power level 354. The graph 400 also illustrates that a second portion of the first slot 342 (e.g., symbol positions 1, 2, . . . 13) are associated with a second power level 404. In some examples, the second power level 404 may be less than the power level 354. In such examples, another power level (such as the second power level 404) associated with at least one symbol position other than the first symbol position (such as symbol positions 1, 2, . . . 13) within the first slot 342 may be less than the power level 354.

In some examples, the second power level 404 may correspond another transmission 402, such as another transmission by another UE during the first slot 342. The other transmission 402 may occur during the first slot 342 (e.g., during symbol positions 0, 1, 2, . . . 13 of the first slot 342). The other transmission 402 may be included in the one or more signals 320. In some other examples, the second power level 404 may be due to noise, interference, or other conditions, which may contribute to signal energy of the one or more signals 320. In some other examples, the second power level 404 may be a zero or near-zero power level.

In some examples, the sub-frame 332 occupies each symbol position 0, 1, 2, . . . 13 of the sub-frame time interval 334, the signal 352 occupies symbol position 0 of the first slot 342, and the transmission 358 occupies symbol positions 0, 1, 2, . . . 13 of the second slot 344. In such examples, the signal 352 may not be transmitted during symbol positions 2, 3, . . . 13 of the first slot 342. To further illustrate, the signal 352 may have a first duration (such as one symbol), and the transmission 358 may have a second duration (such as thirteen symbols) that is greater than the first duration.

In some implementations, the first CV2X wireless communication protocol 330 may specify that symbol position 0 of the sub-frame time interval 334 corresponds to an automatic gain control (AGC) setting time. A device receiving the sub-frame 332 (such as the UE 115x) may perform AGC during the first symbol position (e.g., to determine the gain setting 302).

Figure 4B:
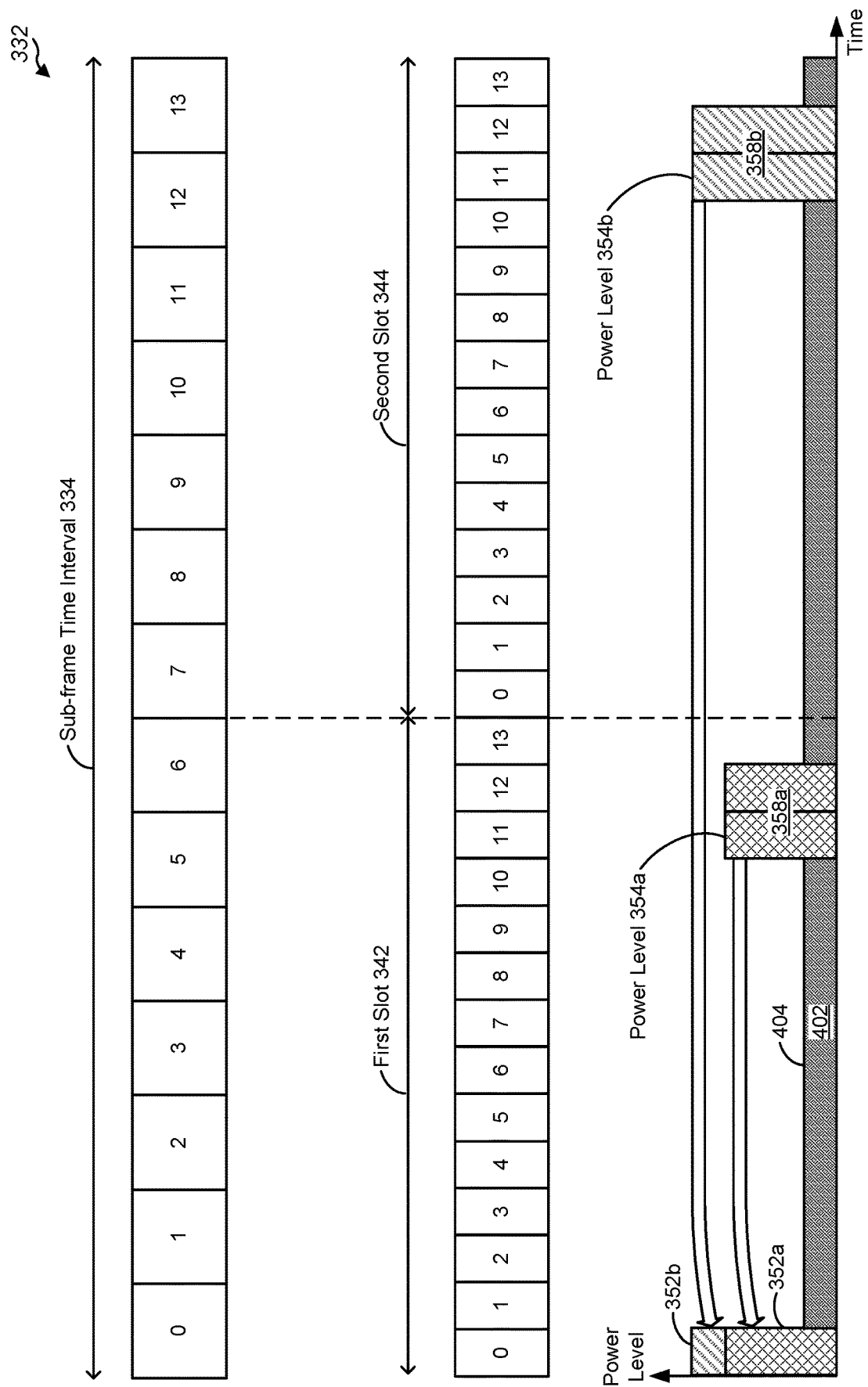
FIG. 4B is another diagram illustrating some aspects that may be associated with a wireless communication system, such as the wireless communication of FIG. 3, according to some aspects.

FIG. 4B is another diagram illustrating some aspects that may be associated with a wireless communication system, such as the wireless communication system 300 of FIG. 3, according to some aspects. In some examples, the operations described with reference to FIG. 4B are performed using the sidelink feedback channel 366 of FIG. 3. One or more operations described with reference to FIG. 4B may be performed alternatively or in addition to operations described with reference to FIG. 4A.

In the example of FIG. 4B, a UE 115 (such as the UE 115z) may perform a transmission 358a during the first slot 342 (e.g., during symbols 11 and 12 of the first slot 342). For example, the UE 115z may receive a first sidelink message from the UE 115x (e.g., via the sidelink data channel 362 or via the sidelink control channel 364), and the transmission 358a may include a feedback message indicating an acknowledgement (ACK) or a negative-acknowledgement (NACK) of the first sidelink message.

Alternatively or in addition, a UE 115 may perform a transmission 358b during the second slot 344 (e.g., during symbols 11 and 12 of the second slot 344). For example, the UE 115z (or another UE) may receive a second sidelink message from the UE 115x (e.g., via the sidelink data channel 362 or via the sidelink control channel 364), and the transmission 358b may include a feedback message indicating an ACK or a NACK of the second sidelink message. The transmission 358a may have a power level 354a. The transmission 358b may have a power level 354b.

To reduce or avoid instances of receiver saturation of an LTE CV2X receiving device, the UE 115 may transmit a signal 352a prior to performing the transmission 358a. The UE 115 may transmit the signal 352a during symbol 0 of the first slot 342, and the signal 352a may have the power level 354a. Alternatively or in addition, the UE 115 (or another UE) may transmit a signal 352b prior to performing the transmission 358b. The UE 115 (or other UE) may transmit the signal 352b during symbol 0 of the first slot 342, and the signal 352b may have the power level 354b. As a result, instances of receiver saturation of an LTE CV2X receiving device due to transmission of sidelink feedback information during symbols 11 and 12 may be reduced or avoided.

Figure 4C:
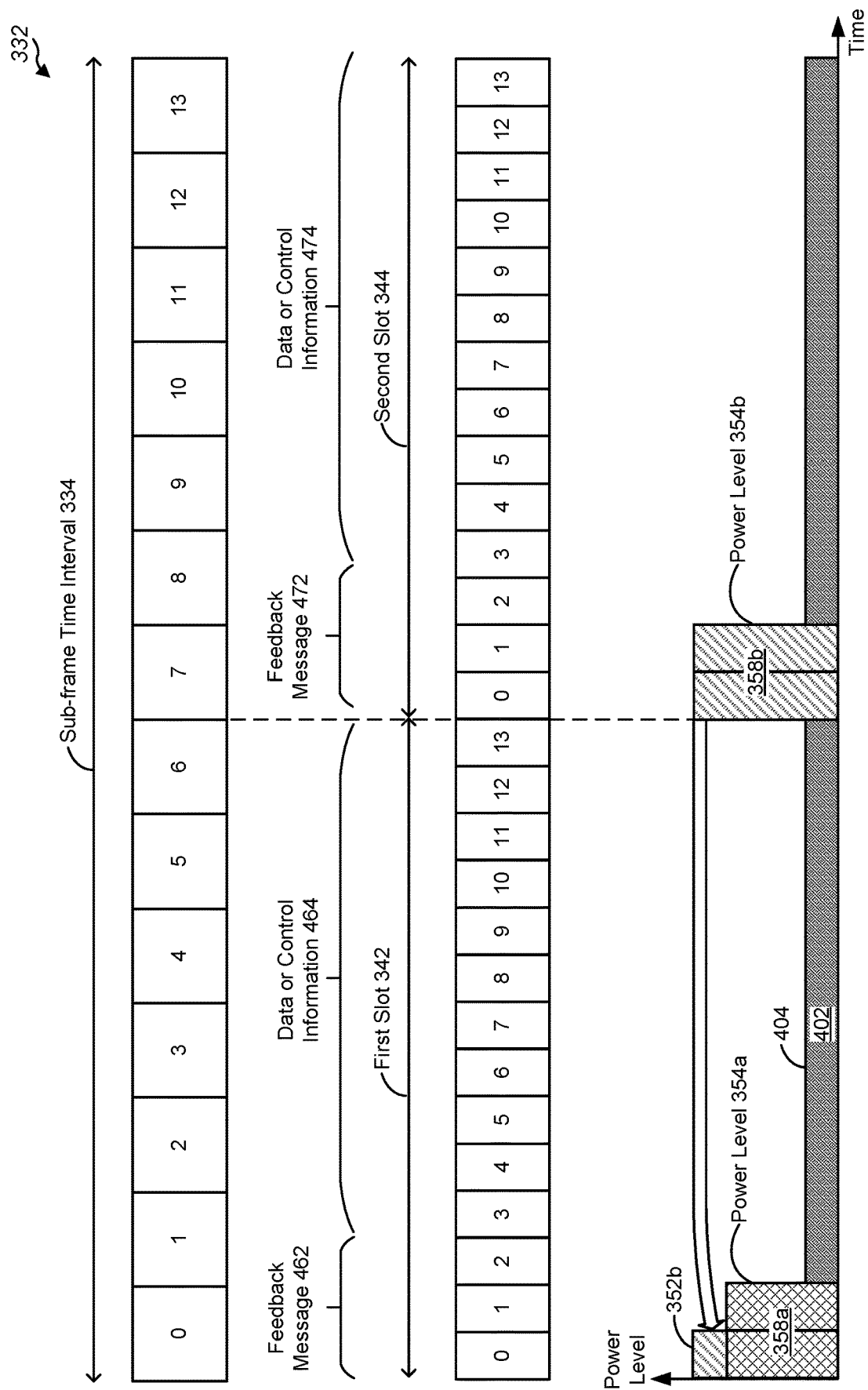
FIG. 4C is another diagram illustrating some aspects that may be associated with a wireless communication system, such as the wireless communication of FIG. 3, according to some aspects.

FIG. 4C is another diagram illustrating some aspects that may be associated with a wireless communication system, such as the wireless communication system 300 of FIG. 3, according to some aspects. In some examples, the operations described with reference to FIG. 4C are performed using one or more of the sidelink data channel 362, the sidelink control channel 364, or the sidelink feedback channel 366 of FIG. 3. One or more operations described with reference to FIG. 4C may be performed alternatively or in addition to operations described with reference to FIG. 4A, alternatively or in addition to operations described with reference to FIG. 4B, or both.

In the example of FIG. 4C, sidelink feedback message may be "swapped" within a slot with sidelink data or control information so that the sidelink feedback message precedes the sidelink data or control information within the slot. For example, a feedback message 462 may precede, within the first slot 342, data or control information 464. In this example, the feedback message 462 may be transmitted during symbols 0 and 1 of the first slot 342, and the data or control information 464 may be transmitted during symbols 2-13 of the first slot 342. As another example, a feedback message 472 may precede, within the second slot 344, data or control information 474. In this example, the feedback message 472 may be transmitted during symbols 0 and 1 of the second slot 344, and the data or control information 474 may be transmitted during symbols 2-13 of the second slot 344.

As a result, a device transmitting the feedback message 462 may be able to receive the data or control information 464 (e.g., instead of "missing" the data or control information 464, which may occur if the data or control information 464 is transmitted during symbols 0-10 and 13 of the first slot 342, as in some wireless communication techniques). Further, a device transmitting the feedback message 472 may be able to receive the data or control information 474 (e.g., instead of "missing" the data or control information 474, which may occur if the data or control information 474 is transmitted during symbols 0-10 and 13 of the second slot 344, as in some wireless communication techniques).

In some circumstances, in the examples of any of FIGS. 4A, 4B, and 4C, transmission of the signal 352, the signal 352a, or the signal 352b during the first slot 342 may reduce performance of a device receiving the other transmission 402. For example, symbol position 0 of the first slot 342 (and the second slot 344) may correspond to an AGC setting time. In such examples, if the signal 352 is transmitted during symbol position 0 of the first slot 342, then a device receiving the other transmission 402 may set a gain setting too high (because the power level 354 exceeds the second power level 404).

Accordingly, in connection with any of FIGS. 4A, 4B, and 4C, the second CV2X wireless communication protocol 340 may specify that a device associated with the second CV2X wireless communication protocol 340 that receives the other transmission 402 during the first slot 342 is to perform gain control for the other transmission 402 based on a second symbol position (e.g., symbol position 1) within the first slot 342 instead of based on a first symbol position (e.g., symbol position 0) within the first slot 342. In an illustrative example, the second symbol position within the first slot 342 occurs after and is adjacent to the first symbol position within the first slot 342 (e.g., where symbol position 1 occurs after and is adjacent to symbol position 0 within the first slot 342). By performing AGC during the second symbol position instead of during the first symbol position, the device may determine a gain setting associated with the first slot 342 based on the second power level 404 instead of based on the power level 354 (e.g., by "ignoring" the power level 354 of the signal 352).

Further, in connection with any of FIGS. 4A, 4B, and 4C, the second CV2X wireless communication protocol 340 may specify that second data is to be duplicated among the second symbol position within the first slot 342 and a third symbol position (e.g., symbol position 2) within the first slot 342. As a result, if data loss of a particular symbol transmitted in the second symbol position occurs (e.g., due to incompletion of an AGC process until the third symbol position), duplicating the particular symbol in the third symbol position may enable a receiving device to receive the particular symbol (e.g., where the AGC process is complete beginning at the third symbol position). In some examples, the second symbol position within the first slot 342 occurs after and is adjacent to the first symbol position within the first slot 342 (e.g., where symbol position 2 occurs after and is adjacent to the symbol position 1).

Further, in connection with any of FIGS. 4A, 4B, and 4C, the second CV2X wireless communication protocol 340 may specify that rate matching is to be performed by a device receiving the other transmission 402 based on a number of symbols associated with the first slot 342 occurring after the third symbol position within the first slot 342. To illustrate, the number of symbols may correspond to eleven (for symbol positions 3, 4, . . . 13), and the device may perform rate matching from fourteen symbols (for symbol positions 0, 1, 2, . . . 13) to eleven symbols (for symbol positions 3, 4, . . . 13).

In some implementations, certain operations described herein may be performed for a transmission selectively based on whether the transmission is scheduled for an initial half or a latter half of a sub-frame. To illustrate, the first slot 342 may have a zero or even slot index (e.g., 0, 2, 4, 6, . . . ), and the second slot 344 may have an odd slot index (e.g., 1, 3, 5, . . . ). In some implementations, the UE 115z may selectively transmit the signal 352 if the first slot 342 is associated with a zero or event slot index and may selectively avoid transmission of the signal 352 if the first slot 342 is associated with an odd slot index. As a result, transmissions associated with a latter half of a sub-frame may be preceded by a duplicated symbol (e.g., the signal 352), and transmissions associated with an initial half of a sub-frame may not be preceded by a duplicated symbol.

Although certain features and operations have been described separately for convenience of illustration, one of skill in the art will appreciate that features and operations described herein may be combined without departing from the scope of the disclosure. For example, in some implementations, the UE 115x may perform one or more operations described with reference to one or more of the UE 115y, the UE 115z, or the other transmission 402. In some examples, the UE 115x may perform operations described with reference to both the first CV2X wireless communication protocol 330 and the second CV2X wireless communication protocol 340, such as in accordance with a dual subscriber identity module (SIM) or multi-SIM (MSIM) implementation. Alternatively or in addition, the UE 115z may perform one or more operations described with reference to one or more of the UE 115x, the UE 115z, or the other transmission 402. In some examples, the UE 115y may perform operations described with reference to both the first CV2X wireless communication protocol 330 and the second CV2X wireless communication protocol 340, such as in accordance with a dual SIM or MSIM implementation.

To further illustrate, FIG. 5 is a block diagram illustrating an example of a wireless communication system 500 according to some aspects of the disclosure. In some examples, the wireless communication system 500 of FIG. 5 may correspond to or may be as described with reference to the wireless communication system 300 of FIG. 3. For example, the wireless communication system 500 may include one or more UEs, such as the UE 115x, the UE 115y, and the UE 115z.

During operation, in some examples, the UE 115x may perform one or more operations described with reference to the second CV2X wireless communication protocol 340. For example, during operation of the UE 115x based on the second CV2X wireless communication protocol 340, the UE 115x may transmit, during a third slot 542, a second signal 552 having a second power level 554 and indicating that a second transmission 558 that is to occur during a fourth slot 544 after the third slot 542 is to have the second power level 554. During the fourth slot 544, the UE 115x may perform the second transmission 558. The second transmission may have the second power level 554.

The third slot 542 and the fourth slot 544 may occur during a second sub-frame time interval 534. The second sub-frame time interval 534 may be associated with the first CV2X wireless communication protocol 330, and the third slot 542 and the fourth slot 544 may be associated with the second CV2X wireless communication protocol 340. The fourth slot 544 may occur after and may be adjacent to the third slot 542. In some examples, the third slot 542 and the fourth slot 544 may occur after the first slot 342 and the second slot 344 of FIG. 3. In some other examples, the third slot 542 and the fourth slot 544 may occur before the first slot 342 and the second slot 344 of FIG. 3.

In some examples, the UE 115z may operate based on the first CV2X wireless communication protocol 330 during the second sub-frame time interval 534 (and during the third slot 542 and the fourth slot 544). For example, the UE 115z may detect one or more second signals 520 (e.g., one or more of signals, noise, or interference) during the third slot 542 while operating based on the first CV2X wireless communication protocol 330. The one or more second signals 520 may include the second signal 552 having the second power level 554. The UE 115z may determine a second gain setting 502 based on the one or more second signals 520. For example, the UE 115z may determine a power level of the one or more second signals 520 (where the power level of the one or more second signals 520 is based at least in part on the second power level 554 of the second signal 552) and may determine, based on the power level, the second gain setting 502 for receiving a second sub-frame 532 during the second sub-frame time interval 534. In such examples, the UE 115z may receive, during operation based on the first CV2X wireless communication protocol 330 and during the second sub-frame time interval 534, the second sub-frame 532 using the second gain setting 502 (e.g., from the UE 115y or from another UE).

In some examples, the UE 115z may operate based on the second CV2X wireless communication protocol 340 during the second sub-frame time interval 534 (and during the third slot 542 and the fourth slot 544). For example, while operating based on the second CV2X wireless communication protocol 340 and during the third slot 542, the UE 115z may receive a third transmission (e.g., from the UE 115y or another UE) during the third slot 542. In some implementations, the second CV2X wireless communication protocol 340 specifies that the UE 115z is to receive the third transmission based on gain control performed based on a second symbol position within the third slot 542 instead of based on a first symbol position within the third slot 542 (where the second symbol position occurs after the first symbol position within the third slot 542).

One or more aspects described herein may improve performance of a device, such as a receiving device of the sub-frame 332. For example, transmission of the signal 352 during the first slot 342 may enable the UE 115x to determine the gain setting 302 based at least in part on the power level 354 of the transmission 358. By determining the gain setting 302 based at least in part on the power level 354 of the transmission 358, the UE 115x may avoid setting a gain too high (e.g., based on a low power level detected during the first slot 342, which may result in receiver saturation of the receiver 318x and potential data loss). As a result, instances of data loss due to receiver saturation of the receiver 318x may be reduced or avoided.

Further in some implementations, one or more features described herein may reduce cost, circuit complexity, or power consumption of a device. For example, in some aspects, receiver saturation may be reduced or avoided without attempting to "isolate" signals associated with the second CV2X wireless communication protocol 340 (e.g., by increasing frequency selectivity of analog receiver components to avoid reception of, or to "reject," signals associated with the second CV2X wireless communication protocol 340, as in certain conventional devices). Increasing frequency selectivity of analog receiver components may involve circuitry that consumes power and that is associated with increased cost and circuit area. As a result, in some examples, cost, circuit complexity, and power consumption of a receiver (such as the receiver 318x) may be reduced as compared to certain conventional devices.

FIG. 6 is a flow diagram illustrating an example of a method 600 of wireless communication according to one or more aspects. In some examples, the method 600 may be performed by a UE 115, such as the UE 115z.

The method 600 includes transmitting a signal during a first slot, at 602. The signal has a power level that is associated with a transmission that is to occur during the first slot or during a second slot after the first slot. The signal is distinct from the transmission. The first slot and the second slot occur during a sub-frame time interval associated with a first CV2X wireless communication protocol, and the first slot is associated with a second CV2X wireless communication protocol different than the first CV2X wireless communication protocol. For example, the UE 115z may transmit the signal 352 during the first slot 342, and the signal 352 may have the power level 354. The power level 354 may be associated with a transmission (such as the transmission 358) that is to occur during the first slot 342 or during the second slot 344. The first slot 342 and the second slot 344 may occur during the sub-frame time interval 334 that is associated with the first CV2X wireless communication protocol 330 and may be associated with the second CV2X wireless communication protocol 340.

The method 600 further includes performing the transmission during the second slot based on the power level, at 604. For example, the UE 115 may perform the transmission 358.

FIG. 7 is a flow diagram illustrating an example of a method 700 of wireless communication according to one or more aspects. In some examples, the method 700 may be performed by a UE 115, such as the UE 115x.

The method 700 includes receiving a first symbol of a sub-frame during a first portion of a sub-frame time interval associated with the sub-frame, at 702. The sub-frame is associated with a first CV2X wireless communication protocol, and a first slot associated with a second CV2X wireless communication protocol different than the first CV2X wireless communication protocol occurs during the sub-frame time interval. For example, the UE 115x may receive the first symbol 336 of the sub-frame 332 during a first portion of the sub-frame time interval 334 associated with the first CV2X wireless communication protocol 330. The first slot 342 associated with the second CV2X wireless communication protocol 340 may occur during the sub-frame time interval 334.

The method 700 further includes receiving, based on a gain setting, one or more second symbols of the sub-frame during a second portion of the sub-frame time interval, at 704. The gain setting is based at least in part on a power level of a signal that is associated with the first slot. A second slot associated with the second CV2X wireless communication protocol occurs after the first slot and during the sub-frame time interval. The first slot or the second slot is associated with a transmission having the power level, where the transmission is distinct from the signal. For example, the UE 115x may receive the one or more second symbols 338 during a second portion of the sub-frame time interval 334 based on the gain setting 302. The gain setting 302 may be based at least in part on the power level 354 of the signal 352 associated with the first slot 342. The second slot 344 associated with the second CV2X wireless communication protocol 340 may occur after the first slot 342 and during the sub-frame time interval 334. The first slot 342 or the second slot 344 may be associated with a transmission (such as the transmission 358) having the power level 354.

Figure 8:
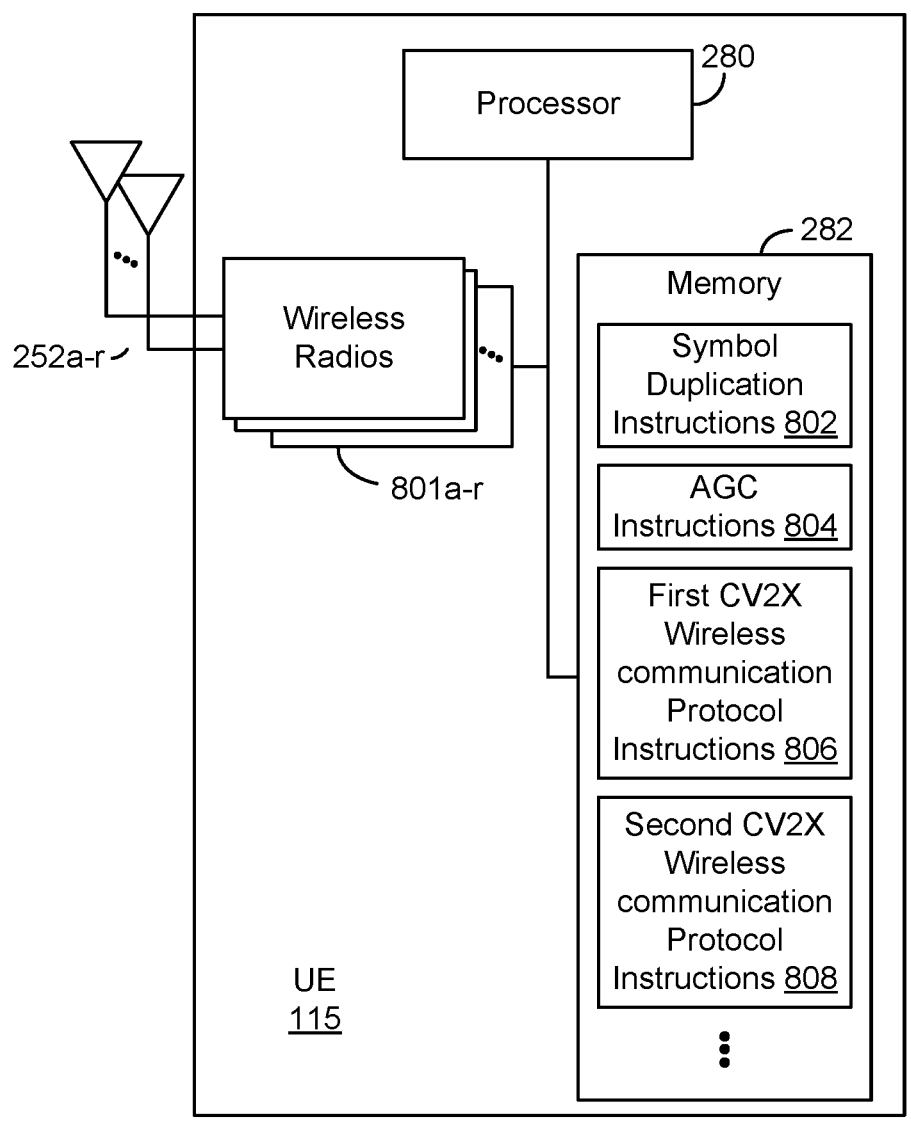
FIG. 8 is a block diagram of an example of a UE according to one or more aspects.

FIG. 8 is a block diagram illustrating an example of the UE 115 according to some aspects of the disclosure. The UE 115 may include structure, hardware, or components illustrated in FIG. 2. For example, the UE 115 may include the processor 280, which may execute instructions stored in the memory 282. Using the processor 280, the UE 115 may transmit and receive signals via wireless radios 801a-r and antennas 252a-r. The wireless radios 801a-r may include one or more components or devices described herein, such as the modulator/demodulators 254a-r, the MIMO detector 256, the receive processor 258, the transmit processor 264, the TX MIMO processor 266, any of the transmitters 316x-z, any of the receivers 318x-z, one or more other components or devices, or a combination thereof.

In some examples, the memory 282 may store instructions executable by one or more processors (e.g., the processor 280) to initiate, perform, or control one or more operations described herein. For example, the memory 282 may store symbol duplication instructions 802 executable by the processor 280 to duplicate a symbol (e.g., by duplicating a symbol of the transmission 358 to generate the signal 352). In some examples, the memory 282 may store AGC instructions 804 executable by the processor 280 to determine a gain setting, such as the gain setting 302. Further, in some examples, the memory 282 may store first CV2X wireless communication protocol instructions 806 executable by the processor 280 to communicate based on the first CV2X wireless communication protocol 330. Alternatively or in addition, the memory 282 may store second CV2X wireless communication protocol instructions 808 executable by the processor 280 to communicate based on the first CV2X wireless communication protocol 330.

According to some further aspects, in a first aspect, an apparatus for wireless communication includes a receiver and a transmitter that is configured to transmit a signal during a first slot. The signal has a power level that is associated with a transmission that is to occur during the first slot or during a second slot after the first slot. The signal is distinct from the transmission. The first slot and the second slot occur during a sub-frame time interval associated with a first cellular CV2X wireless communication protocol, and the first slot and the second slot are associated with a second CV2X wireless communication protocol different than the first CV2X wireless communication protocol. The transmitter is further configured to perform the transmission during the second slot based on the power level.

In a second aspect alternatively or in addition to the first aspect, the signal includes a subset of the transmission transmitted to enable determination of a gain setting based at least in part on the power level of the transmission that is to occur during the second slot.

In a third aspect alternatively or in addition to one or more of the first through second aspects, the subset corresponds to a duplicated symbol of the transmission.

In a fourth aspect alternatively or in addition to one or more of the first through third aspects, the transmitter is further configured to transmit the signal during a first portion of the first slot and to terminate transmitting the signal during a second portion of the first slot occurring after the first portion.

In a fifth aspect alternatively or in addition to one or more of the first through fourth aspects, the signal includes first data of the transmission transmitted during a first symbol position within the first slot and having the power level, and the transmission includes the first data transmitted during the first symbol position within the second slot and having the power level.

In a sixth aspect alternatively or in addition to one or more of the first through fifth aspects, the first symbol position corresponds to an AGC setting time.

In a seventh aspect alternatively or in addition to one or more of the first through sixth aspects, the second CV2X wireless communication protocol specifies that a device associated with the second CV2X wireless communication protocol that receives another transmission during the first slot is to perform gain control based on a second symbol position within the first slot instead of based on the first symbol position within the first slot.

In an eighth aspect alternatively or in addition to one or more of the first through seventh aspects, the second symbol position within the first slot occurs after and is adjacent to the first symbol position within the first slot.

In a ninth aspect alternatively or in addition to one or more of the first through eighth aspects, the second CV2X wireless communication protocol further specifies that second data is to be duplicated among the second symbol position within the first slot and a third symbol position within the first slot and further specifies rate matching to be performed based on a number of symbols occurring after the third symbol position within the first slot, and the third symbol position within the first slot occurs after and is adjacent to the second symbol position within the first slot.

In a tenth aspect alternatively or in addition to one or more of the first through ninth aspects, the transmitter is further configured to transmit the signal and the transmission via a sidelink data channel or via a sidelink control channel.

In an eleventh aspect alternatively or in addition to one or more of the first through tenth aspects, the receiver is configured to receive a sidelink message via a sidelink data channel or via a sidelink control channel, the transmitter is further configured to transmit the signal and the transmission via a sidelink feedback channel, and the transmission include a feedback message indicating an ACK or a NACK of the sidelink message.

In a twelfth aspect alternatively or in addition to one or more of the first through eleventh aspects, the feedback message precedes, within the first slot or within the second slot, one or more of data or control information.

In a thirteenth aspect alternatively or in addition to one or more of the first through twelfth aspects, an apparatus for wireless communication includes a transmitter and a receiver that is configured to receive a first symbol of a sub-frame during a first portion of a sub-frame time interval associated with the sub-frame. The sub-frame is associated with a first CV2X wireless communication protocol, and a first slot associated with a second CV2X wireless communication protocol different than the first CV2X wireless communication protocol occurs during the sub-frame time interval. The receiver is further configured to receive, based on a gain setting, one or more second symbols of the sub-frame during a second portion of the sub-frame time interval. The gain setting is based at least in part on a power level of a signal that is associated with the first slot. A second slot associated with the second CV2X wireless communication protocol occurs after the first slot and during the sub-frame time interval. The first slot or the second slot is associated with a transmission having the power level, where the transmission is distinct from the signal.

In a fourteenth aspect alternatively or in addition to one or more of the first through thirteenth aspects, the signal includes a subset of the transmission transmitted during the first slot to enable determination of the gain setting based at least in part on the power level of the transmission that is to occur during the second slot.

In a fifteenth aspect alternatively or in addition to one or more of the first through fourteenth aspects, the first portion corresponds to an AGC setting time.

In a sixteenth aspect alternatively or in addition to one or more of the first through fifteenth aspects, a first symbol duration associated with the sub-frame is greater than a second symbol duration associated with transmission.

In a seventeenth aspect alternatively or in addition to one or more of the first through sixteenth aspects, a method for wireless communication includes transmitting a signal during a first slot. The signal has a power level that is associated with a transmission that is to occur during the first slot or during a second slot after the first slot. The signal is distinct from the transmission. The first slot and the second slot occur during a sub-frame time interval associated with a first CV2X wireless communication protocol, and the first slot is associated with a second CV2X wireless communication protocol different than the first CV2X wireless communication protocol. The method further includes performing the transmission during the second slot based on the power level.

In an eighteenth aspect alternatively or in addition to one or more of the first through seventeenth aspects, the signal includes a subset of the transmission transmitted during the first slot to enable determination of a gain setting based at least in part on the power level of the transmission that is to occur during the second slot.

In a nineteenth aspect alternatively or in addition to one or more of the first through eighteenth aspects, the subset corresponds to a duplicated symbol of the transmission.

In a twentieth aspect alternatively or in addition to one or more of the first through nineteenth aspects, the signal is transmitted during a first portion of the first slot and further comprising terminating transmitting the signal for a second portion of the first slot occurring after the first portion.

In a twenty-first aspect alternatively or in addition to one or more of the first through twentieth aspects, the signal includes first data of the transmission transmitted during a first symbol position within the first slot and having the power level, and the transmission includes the first data transmitted during the first symbol position within the second slot and having the power level.

In a twenty-second aspect alternatively or in addition to one or more of the first through twenty-first aspects, the first symbol position corresponds to an AGC setting time.

In a twenty-third aspect alternatively or in addition to one or more of the first through twenty-second aspects, another power level associated with at least one symbol position other than the first symbol position within the first slot is less than the power level of the transmission.

In a twenty-fourth aspect alternatively or in addition to one or more of the first through twenty-third aspects, the second CV2X wireless communication protocol specifies that a device associated with the second CV2X wireless communication protocol that receives another transmission during the first slot is to perform gain control based on a second symbol position within the first slot instead of based on the first symbol position within the first slot.

In a twenty-fifth aspect alternatively or in addition to one or more of the first through twenty-fourth aspects, the second symbol position within the first slot occurs after and is adjacent to the first symbol position within the first slot.

In a twenty-sixth aspect alternatively or in addition to one or more of the first through twenty-fifth aspects, the second CV2X wireless communication protocol further specifies that second data is to be duplicated among the second symbol position within the first slot and a third symbol position within the first slot and further specifies rate matching to be performed based on a number of symbols occurring after the third symbol position within the first slot, and the third symbol position within the first slot occurs after and is adjacent to the second symbol position within the first slot.

In a twenty-seventh aspect alternatively or in addition to one or more of the first through twenty-sixth aspects, a method for wireless communication includes receiving a first symbol of a sub-frame during a first portion of a sub-frame time interval associated with the sub-frame. The sub-frame is associated with a first CV2X wireless communication protocol, and a first slot associated with a second CV2X wireless communication protocol different than the first CV2X wireless communication protocol occurs during the sub-frame time interval. The method further includes receiving, based on a gain setting, one or more second symbols of the sub-frame during a second portion of the sub-frame time interval. The gain setting is based at least in part on a power level of a signal that is associated with the first slot. A second slot associated with the second CV2X wireless communication protocol occurs after the first slot and during the sub-frame time interval. The first slot or the second slot is associated with a transmission having the power level, where the transmission is distinct from the signal.

In a twenty-eighth aspect alternatively or in addition to one or more of the first through twenty-seventh aspects, the signal includes a subset of the transmission to enable determination of the gain setting based at least in part on the power level of the transmission that is to occur during the second slot.

In a twenty-ninth aspect alternatively or in addition to one or more of the first through twenty-eighth aspects, the first portion corresponds to an AGC setting time.

In a thirtieth aspect alternatively or in addition to one or more of the first through twenty-ninth aspects, a first symbol duration associated with the sub-frame is greater than a second symbol duration associated with transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and modules described herein may include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, the apparatus comprising:
a receiver; and
a transmitter configured to:
transmit a signal during a first slot, wherein the signal has a power level that is associated with a transmission that is to occur during the first slot or during a second slot after the first slot, wherein the signal is distinct from the transmission, wherein the first slot and the second slot occur during a sub-frame time interval associated with a first cellular vehicle-to-everything (CV2X) wireless communication protocol, and wherein the first slot and the second slot are associated with a second CV2X wireless communication protocol different than the first CV2X wireless communication protocol; and perform the transmission during the second slot based on the power level.

2. The apparatus of claim 1, wherein the signal includes a subset of the transmission transmitted to enable determination of a gain setting based at least in part on the power level of the transmission that is to occur during the second slot.

3. The apparatus of claim 2, wherein the subset corresponds to a duplicated symbol of the transmission.

4. The apparatus of claim 1, wherein the transmitter is further configured to transmit the signal during a first portion of the first slot and to terminate transmitting the signal during a second portion of the first slot occurring after the first portion.

5. The apparatus of claim 1, wherein the signal includes first data of the transmission transmitted during a first symbol position within the first slot and having the power level, and wherein the transmission includes the first data transmitted during the first symbol position within the second slot and having the power level.

6. The apparatus of claim 5, wherein the first symbol position corresponds to an automatic gain control (AGC) setting time.

7. The apparatus of claim 5, wherein the second CV2X wireless communication protocol specifies that a device associated with the second CV2X wireless communication protocol that receives another transmission during the first slot is to perform gain control based on a second symbol position within the first slot instead of based on the first symbol position within the first slot.

8. The apparatus of claim 7, wherein the second symbol position within the first slot occurs after and is adjacent to the first symbol position within the first slot.

9. The apparatus of claim 7, wherein the second CV2X wireless communication protocol further specifies that second data is to be duplicated among the second symbol position within the first slot and a third symbol position within the first slot and further specifies rate matching to be performed based on a number of symbols occurring after the third symbol position within the first slot, and wherein the third symbol position within the first slot occurs after and is adjacent to the second symbol position within the first slot.

10. The apparatus of claim 1, wherein the transmitter is further configured to transmit the signal and the transmission via a sidelink data channel or via a sidelink control channel.

11. The apparatus of claim 1, wherein the receiver is configured to receive a sidelink message via a sidelink data channel or via a sidelink control channel, wherein the transmitter is further configured to transmit the signal and the transmission via a sidelink feedback channel, and wherein the transmission include a feedback message indicating an acknowledgement (ACK) or a negative-acknowledgement (NACK) of the sidelink message.

12. The apparatus of claim 11, wherein the feedback message precedes, within the first slot or within the second slot, one or more of data or control information.

13. A method for wireless communication, the method comprising:

transmitting a signal during a first slot, wherein the signal has a power level that is associated with a transmission that is to occur during the first slot or during a second slot after the first slot, wherein the signal is distinct from the transmission, wherein the first slot and the second slot occur during a sub-frame time interval associated with a first cellular vehicle-to-everything (CV2X) wireless communication protocol, and wherein the first slot is associated with a second CV2X wireless communication protocol different than the first CV2X wireless communication protocol; and perform the transmission during the second slot based on the power level.

14. The method of claim 13, wherein the signal includes a subset of the transmission transmitted during the first slot to enable determination of a gain setting based at least in part on the power level of the transmission that is to occur during the second slot.

15. The method of claim 14, wherein the subset corresponds to a duplicated symbol of the transmission.

16. The method of claim 13, wherein the signal is transmitted during a first portion of the first slot and further comprising terminating transmitting the signal for a second portion of the first slot occurring after the first portion.

17. The method of claim 13, wherein the signal includes first data of the transmission transmitted during a first symbol position within the first slot and having the power level, and wherein the transmission includes the first data transmitted during the first symbol position within the second slot and having the power level.

18. The method of claim 17, wherein the first symbol position corresponds to an automatic gain control (AGC) setting time.

19. The method of claim 17, wherein another power level associated with at least one symbol position other than the first symbol position within the first slot is less than the power level of the transmission.

20. The method of claim 17, wherein the second CV2X wireless communication protocol specifies that a device associated with the second CV2X wireless communication protocol that receives another transmission during the first slot is to perform gain control based on a second symbol position within the first slot instead of based on the first symbol position within the first slot.

21. The method of claim 20, wherein the second symbol position within the first slot occurs after and is adjacent to the first symbol position within the first slot.

22. The method of claim 20, wherein the second CV2X wireless communication protocol further specifies that second data is to be duplicated among the second symbol position within the first slot and a third symbol position within the first slot and further specifies rate matching to be performed based on a number of symbols occurring after the third symbol position within the first slot, and wherein the third symbol position within the first slot occurs after and is adjacent to the second symbol position within the first slot.

* * * * *